Dec. 26, 1961 W. A. GROVES 3,014,626
MOTION PICTURE FILM FEEDING
Filed April 27, 1959 2 Sheets-Sheet 1

INVENTOR
WILLIAM A. GROVES

BY Strauch, Nolan & Neale
ATTORNEYS

Dec. 26, 1961  W. A. GROVES  3,014,626
MOTION PICTURE FILM FEEDING

Filed April 27, 1959  2 Sheets-Sheet 2

INVENTOR
WILLIAM A. GROVES

BY Strauch, Nolan + Neale
ATTORNEYS

United States Patent Office 3,014,626
Patented Dec. 26, 1961

3,014,626
MOTION PICTURE FILM FEEDING
William A. Groves, Ann Arbor, Mich., assignor to Sylvania Electric Products Inc., a corporation of Delaware
Filed Apr. 27, 1959, Ser. No. 809,019
3 Claims. (Cl. 226—62)

This invention relates to an intermittent film feeding mechanism in a motion picture machine and particularly to special claw operation and framing arrangements.

The invention relates to that type of intermittent film feed wherein a toothed or claw member has cyclic movement through a path wherein from an initial position it moves toward the film to enter a sprocket hole, pulls the film down past the projection or exposure aperture one or more frames, withdraws from the film and returns to initial position. In its preferred embodiment the invention herein described is best suited for a motion picture projector.

It is the major object of the invention to provide a novel intermittent grip type film advancing mechanism having special cam actuation.

A further object of the invention is to provide an intermittent grip type film advancing mechanism having a novel framing arrangement.

It is still a further object of the invention to provide an intermittent grip type claw feed for motion picture film wherein an arm pivoted to oscillate in the general direction of film movement is laterally rockable and controlled in all movements by a three dimensional cam.

A further object of the invention is to provide a novel adjustable mount for the end of a motion picture pull down claw to permit both horizontal and vertical rocking movement of the claw.

A further object is to provide a novel film moving claw actuating cam and shutter assembly.

Further objects of the invention will appear as the description proceeds in connection with the appended claims and the annexed drawings wherein:

In the motion picture projector a suitable film track member 10 is provided having a projection aperture 11 in optical alignment with the projection objective and a vertical feed slot 12 adapted to permit a feed claw to enter the film gate to move the film intermittently. No particular form of track is shown in detail as any relatively stationary track structure having these apertures will be suitable.

Figure 1:
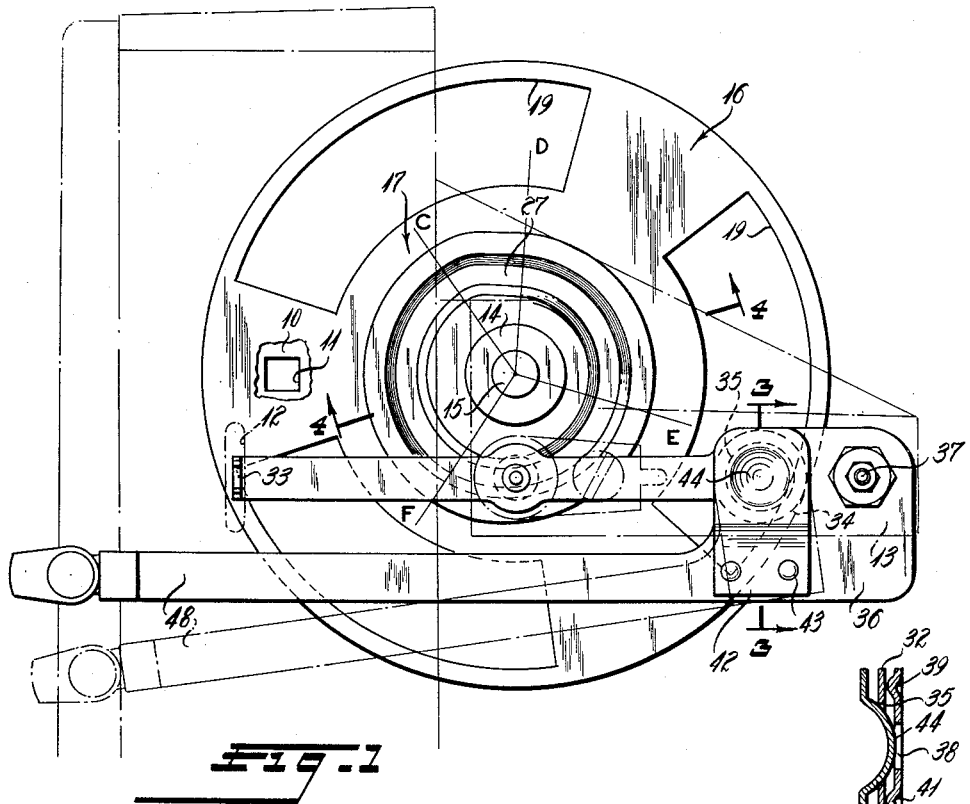
FIGURE 1 is a front elevation showing the intermittent feed claw and framing arrangements and the cam.
Figure 2:
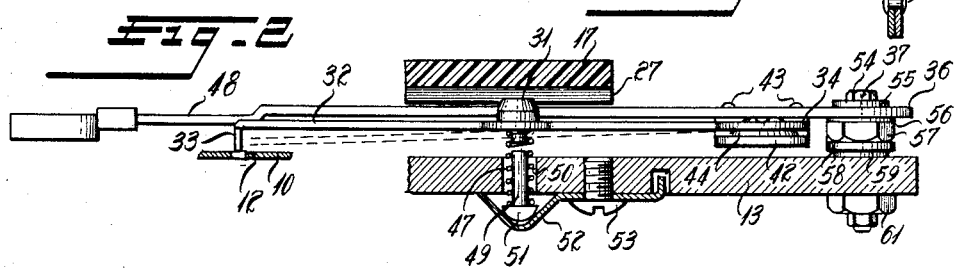
FIGURE 2 is a top view partly in section showing the feed claw and framing arrangement of FIGURE 1.
Figure 4:
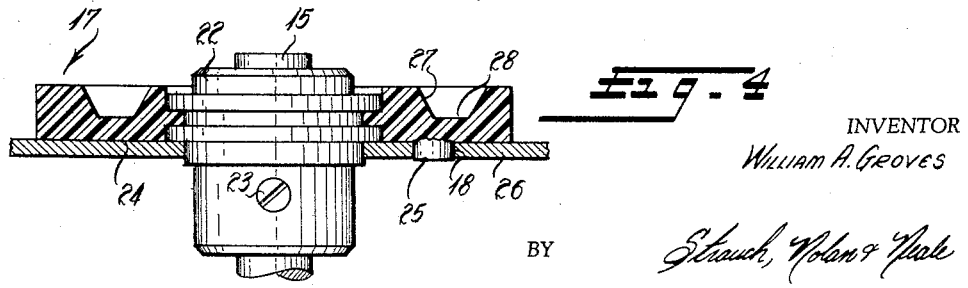
FIGURE 4 is a section through the multi-dimensional cam.

FIGURES 1 and 2 illustrate a frame portion 13 which is rigid with the track 10 and on which the film advancing mechanism to be described is wholly supported. Rigid with frame portion 13 is a boss 14 in which is journaled a shaft 15 that extends parallel to but offset from the optical axis of aperture 11.

Figure 5:
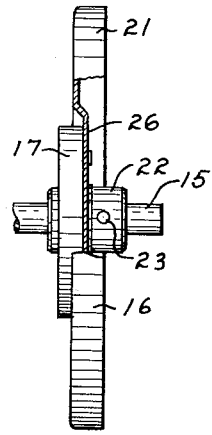
FIGURE 5 is an end view partly in section of the cam and shutter subassembly.
Figure 6:
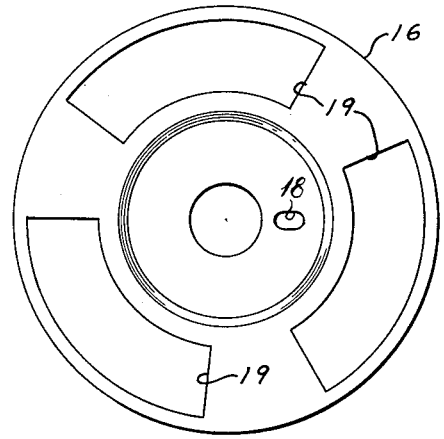
FIGURE 6 is an elevation of the shutter.

Mounted on shaft 15 is a shutter and cam assembly consisting of a rotary shutter 16 and a face cam 17 (FIGURE 5). Shutter 16 is of the usual sector type (FIGURE 6) and it has a radially slotted aperture 18 inwardly of light passing sectors 19. The flanged rim 21 of shutter 16 is normally engaged by forward or reverse driving friction wheels not shown.

Cam 17 is preferably a one-piece molded element of solid plastic such as nylon or the like. Preferably cam 17 is molded non-rotatably onto a rigid hub 22 that is secured to shaft 15 as by set screw 23. On the back of cam 17 is a flat surface 24 having a cylindrical projection 25 that extends into shutter slot 18 for properly angularly orienting cam 17 with respect to the shutter openings. Shutter 16 is a one-piece stamped sheet metal part having a recessed central portion 26 (FIGURE 5) wherein cam 17 is seated with its surface 24 adhesively secured to the shutter metal. This provides a permanent assembly of shutter and cam ready to be mounted on the shaft 15.

Cam 17 is formed on its front surface with a continuous V groove 27 that is shaped to control all movements of the film feed arm tooth 33. Groove 27 comprises circumferentially a continuously curved section on a fixed radius, a second continuously curved section of changing radius and a short rather steep straight section connecting the adjacent ends of the curved sections. The sides of the V groove of cam 17 are three dimensional and control not only the radial movement of the cam follower but the axial movement of it as well to control in and out movement of the film advancing claw tooth as will appear.

Figure 3:
FIGURE 3 is an enlarged section on line 3—3 of FIGURE 1 showing the feed claw arm pivot.

Constantly engaged in groove 27 is a cam follower 31 that (FIGURE 2) is fixed upon a one-piece sheet metal claw arm 32 which carries at its outer end a forwardly bent film sprocket hole engaging toothed section 33 and is universally rockably mounted at its inner end. Arm 32 terminates in a rounded inner end 34 having a circular aperture 35 (FIGURE 3). The sides of groove 27 are inclined as are the sides of follower 31 to insure engagement.

A framing plate 36 is pivotally mounted at 37 upon a friction pivot assembly. This assembly 37 may be of any suitable axially biased construction that will maintain plate 36 in any angular relationship about the pivot axis to which it may be turned, and it is mounted on the frame 13. Thus plate 36 is frictionally adjustably mounted upon an axis at 37 that is parallel to the projection axis.

Adjacent its pivot assembly 37, plate 36 is formed with an aperture 38 flanked above and below (FIGURE 3) by similar surface detents 39 and 41. These detents are preferably shallow rounded projections struck out of the metal of plate 36. As shown in FIGURE 3 these detents are slidably and rockably contacted by the flat side of inner end 34 of claw arm 32, and are spring urged thereagainst by a spring retainer 42 comprising a metal clip riveted to plate 36 at 43 and having a semi-spherical dome 44 on which the aperture 35 of arm 32 seats. Projections 39, 41 keep arm 32 spaced from plate 36 and permit lateral rocking of arm 32. Preferably, detents 39 and 41 are vertically aligned with each other along a transverse axis passing through the center of dome 44.

Figure 8:
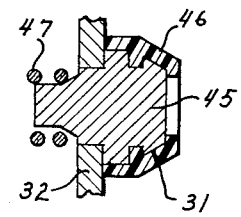
FIGURE 8 is an enlarged fragmentary section showing the cam follower.

As shown in FIGURE 8 follower 31 comprises a steel pin 45 that is intermediately fixed in arm 32 and on the cam side is formed with a button 46 of nylon or the like shaped to fit into groove 27. The other end of pin 45 extends through arm 32 to receive an end of a coil compression spring 47 that extends through an aperture 50 in frame 13 around the stem of a pin 49 having a rounded end 51 universally mounted in a cap 52 secured to frame 13 as by screw 53. It will be appreciated that aperture 50 must be sufficiently large to permit movement of arm 32 and follower 31 as cam 17 is rotated.

Spring 47 thus exerts a constant force tending to rock arm 32 toward cam 17 and thus urge cam follower 31 to follow changes in depth of cam groove as determined by the spacing of the cam groove sides. The cam follower 31 clears the floor 28 of groove 27 at all times. The spring 42 provides a resilient universal end mounting for arm 32 that permits this rocking movement of arm 32, as well as pivotal movement of arm 32 in a direction parallel to film movement.

Since pivot assembly 37 is offset from the axis of the claw arm pivot at 44 it will be seen that by the operator grasping handle 48 fixed to framing plate 36, plate 36 may be rocked about axis 37 and this swings the axis of arm 32 in a rather wide arc about the axis of 37 as a center to adjustably vertically position the claw arm axis and thereby adjust its points of engagement and withdrawal from the film for framing. This vertical adjustment of the film advancing tooth path does not change the cycle. Friction pivot 37 retains this framing adjustment which is effected without changing the engagement of follower 31 in groove 27.

With special reference to pivot assembly 37 it comprises a threaded stud 54 with a friction washer 55 engaging one side of plate 36. Another friction washer 56 engages the other side of plate 36 and the friction clutch relation is maintained at the pivot by a lock nut 57 on the stud that controls axial compression. This structure also keeps plate 36 at right angles to stud 54.

Between nut 57 and frame 13 are disposed a washer 58 and a nut 59 surrounding the stud, and on the other side of frame 13 is a lock nut assembly 61 on the stud. By suitable relative adjustment of the nuts 59 and 61 the entire friction pivot and frame plate may be shifted parallel to the projection axis bodily toward or away from cam 17.

The mounting at the end of arm 32 wherein dome 44 and projections 39, 41 resiliently embrace opposite sides of the arm and permit both horizontal and vertical rocking of arm 32, maintains essentially zero radial or axial clearances at the pivot so that absolute accuracy of the film movement is inexpensively attained and wear at the pivot is automatically compensated by the take-up action of spring retainer 42.

In operation the arm 32 is moved by the coaction of follower 31 in groove 27 to effect the desired film advancing movement in timed relation to passage of shutter openings over the aperture 11. Starting with the film at rest the teeth 33 at the beginning of the cycle are disposed out of contact with the film and adjacent the top of slot 12. At this time follower 31 is disposed within the groove 27 and disposed in the constant circularly curved part of the cam groove.

Now the spacing between the cam side walls narrows to raise the follower 31 further from the level of cam groove floor 28 and rock arm 32 toward the film where teeth 33 enter sprocket holes. During this period there is no vertical oscillation of the arm 32 about its pivot.

After the teeth 33 have entered the film sprocket holes, the arm 32 is shifted speedily downwardly in slot 12 for the distance of one film frame. During this time the follower is in the straight section of groove 27 which is about 20° in extent angularly and maintains its maximum height from the floor 28 so that there is no rocking of arm 32 away from the film.

After reaching the bottom of its stroke arm 32 is now rocked away from the film to disengage therefrom. This is accomplished by follower 31 moving along a downwardly sloping ramp in groove 27 of about 90° in extent circumferentially. Then, with the arm 32 maintained in disengaged position, the arm 32 is returned to initial position ready to start another cycle.

Figure 7:
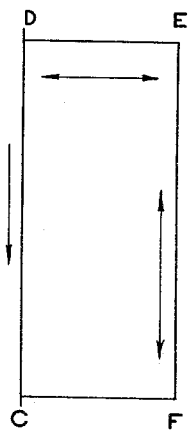
FIGURE 7 is a diagrammatic view showing the path of the cam follower related to the contours of the cam of FIGURE 1.

The cam in FIGURE 1 is angularly marked as radii C—D—E—F to correlate it to the correspondingly labeled diagrammatic follower path at FIGURE 7, it being appreciated that movement of follower 31 is reflected in magnified manner at the teeth 33.

Should the picture be out of frame at the aperture 11, the operator can speedily correct this by grasping handle 48 and rocking the entire assembly about the pivot axis at 37 until the pull down stroke is properly located with respect to aperture 11.

The invention may be embodied in other specific forms without departing from the spirit or essential characteristics thereof. The present embodiments are therefore to be consideerd in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In motion picture apparatus having a picture light aperture, means for intermittently moving film across said aperture comprising an arm pivoted at one end to permit horizontal rocking movement of the arm as well as pivotal movement of the arm in a direction parallel to film movement, at least one film sprocket hole engaging tooth on the other end of said arm, a rotatable face cam intermediately operatively engaged with said arm, said cam having a continuous generally V-shaped groove with opposed sides and providing a first continuous curved section on a fixed radius, a second continuous curved section of changing radius and connected to one end to said first curved section, and a short straight chordally extending section connecting adjacent ends of said first and second curved sections together, a follower mounted on said arm and received in said groove, a coil spring acting on said arm from the side remote from and adjacent said follower for laterally biasing said arm toward said cam to maintain said follower in constant contact with said groove, the spacing between the sides of said groove at said first curved section being arranged to become narrower along a predetermined portion thereof to permit said follower to be raised further out of said groove to cause said arm to rock in a horizontal direction but to be free of vertical displacement thereby imparting a film engaging stroke to said tooth, said straight section having its sides spaced to maintain said follower in raised position and to impart vertical displacement to said tooth to provide a film pull down stroke, said second curved section providing vertical displacement for said tooth and being arranged with the sides thereof to provide a horizontal film disengaging stroke to said tooth.

2. In an intermittent film feed mechanism, a support; an arm formed with one side facing toward said support and an opposite side facing away from said support, said arm having at least one sprocket hole engaging tooth at one end remote from said support and a circular aperture facing and adjacent to said support; a unitary pivotal mounting member for said arm and comprising a mounting section rigidly fixed to said support, a spherically surfaced section extending into said aperture from the side of said arm facing away from said support and a spring member integrally interconnecting said mounting section and said spherically surfaced section to bias said spherically surfaced section into abutment with the edges of said aperture; said support having surface projections protruding toward and in contact with said arm above and below said aperture, said spring member biasing the side of said arm through the engagement of said spherically surfaced section with the edges of said aperture into contact with said projections so that said arm is spaced from said one side of said support and is rockable toward and away from said support.

3. In a mechanism defined in claim 2, a rotatable face cam disposed substantially in a vertical plane intermediately operatively engaged with said arm, said cam having a continuous groove of changing effective depth on one vertical side thereof, a follower on said arm between said tooth and said aperture and disposed in said groove, and a coil spring acting on said arm on the side remote from and adjacent said follower for laterally biasing said arm toward said cam to maintain said follower in constant contact with said groove.

References Cited in the file of this patent

UNITED STATES PATENTS

| | | |
|---|---|---|
| 2,168,771 | Howell | Aug. 8, 1939 |
| 2,484,348 | Kellogg et al. | Oct. 11, 1949 |
| 2,521,957 | Wittel et al. | Sept. 12, 1950 |

FOREIGN PATENTS

| | | |
|---|---|---|
| 1,125,536 | France | July 16, 1956 |